(12) United States Patent
Daniels et al.

(10) Patent No.: US 6,189,808 B1
(45) Date of Patent: Feb. 20, 2001

(54) AUTOMATICALLY CONTROLLED WASHER SYSTEM FOR HEADLAMPS

(75) Inventors: George F. Daniels; Carl F. Kackenmeister, both of Stratham, NH (US)

(73) Assignee: McCord Winn Textron Inc., Manchester, NH (US)

( * ) Notice: Under 35 U.S.C. 154(b), the term of this patent shall be extended for 0 days.

(21) Appl. No.: 09/292,508

(22) Filed: Apr. 15, 1999

(51) Int. Cl.⁷ ...................................................... B05B 1/10
(52) U.S. Cl. .................................... 239/284.2; 15/250.002
(58) Field of Search .............................. 239/284.1, 284.2, 239/67, 69, 71, 104; 15/250.002, 250.01, 250.04; 362/96; 180/271; 280/847, 159; 307/10.1, 117; 318/483, 446; 340/942, 458, 600, 619

(56) References Cited

U.S. PATENT DOCUMENTS

| | | |
|---|---|---|
| 3,609,450 | 9/1971 | Hart . |
| 3,736,560 | 5/1973 | Hart . |
| 4,210,841 | 7/1980 | Vodicka et al. . |
| 4,713,583 | 12/1987 | Hochstein . |
| 5,446,586 | * 8/1995 | Dornier .............................. 15/250.01 |

* cited by examiner

*Primary Examiner*—Lisa Ann Douglas
(74) *Attorney, Agent, or Firm*—Reising, Ethington, Barnes, Kisselle, Learman & McCulloch PC

(57) ABSTRACT

A headlamp cleaning system has a headlamp especially suited to HID or tungsten halogen applications including a source of light and a polycarbonate lens for distributing the light and a control system for automatically controlling a pump for distributing washer fluid against the lens each time that the vehicle ignition is turned on and whenever a sensor for sensing dirt build-up on the lens signals the presence of dirt build-up thereon and the control system continues the cleaning cycle until all dirt is removed from the lens.

4 Claims, 7 Drawing Sheets

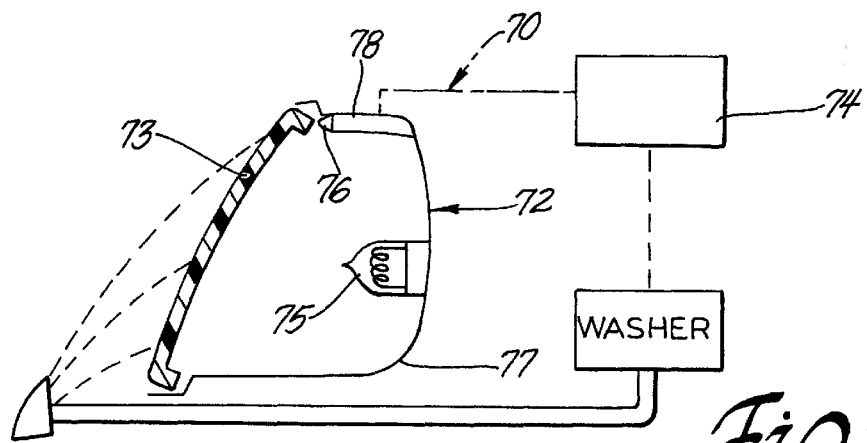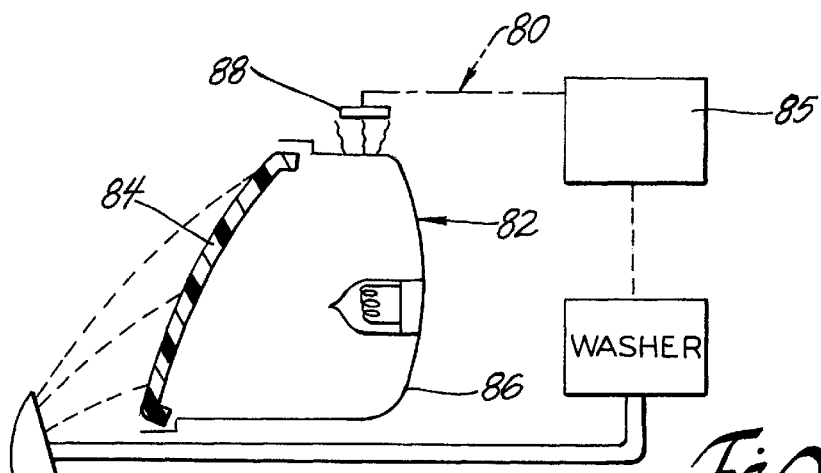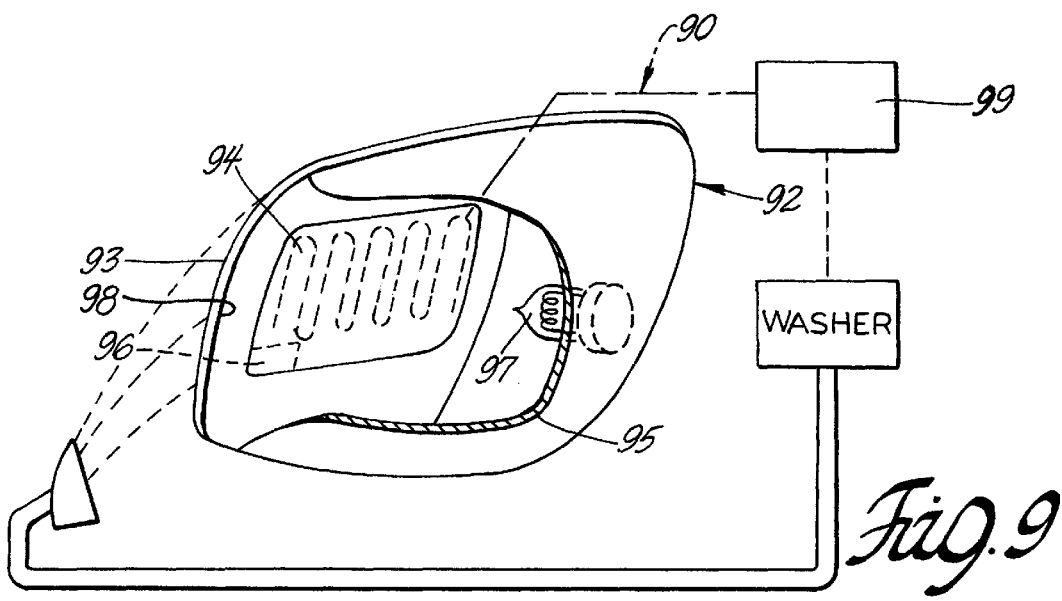

AUTOMATICALLY CONTROLLED WASHER SYSTEM FOR HEADLAMPS

FIELD OF THE INVENTION

This invention relates to headlamp cleaning systems and more particularly to headlamp cleaning systems wherein washer fluid is directed against a lens for removing a dirt build-up from the lens so as to improve light distribution therefrom.

BACKGROUND OF THE INVENTION

Various headlamp cleaning systems are known wherein a headlamp with a housing; a source of light and a covering lens is cleaned by a lens washer system including a source of fluid, a pump for the fluid and a nozzle for distributing the fluid against the lens for removing dirt build-up.

One such system is set-forth in U.S. Pat. Nos. 3,609,450 and 3,736,560. These patents disclose a controller that senses dirt build-up on a lens by use of a photometrics sensor that is separate from the headlamp. The controller includes a dash board display of headlamp condition after washing.

U.S. Pat. No. 4,713,583 discloses a cleaning system wherein the headlamp dirt build-up sensing is provided by reflective sensing and the sensor is integrated within the headlamp.

U.S. Pat. No. 4,210,841 discloses a headlamp assembly having a plastic lens but there is no suggestion of a dirt build-up deterioration of the lens affecting the transmission of light.

While suitable for their intended purpose, the aforesaid prior art arrangements do not disclose the use of headlamp cleaning systems especially adapted for use with light sources such as an HID (high intensity discharge) headlamp or a tungsten halogen headlamp that includes a plastic lens. In such cases the road dirt on the surface of a plastic lens covering a high temperature, high intensity discharge lamp such as is the case with HID headlamps can be literally baked onto a lens so that the outer surface of the lens becomes less light transmissive over time even after a washer cleaning cycle or cycles.

SUMMARY OF THE INVENTION

Accordingly, an object of the present invention is to provide an automatically operated headlamp cleaning system that will prevent road dirt buildup on a plastic lens of a headlamp in a manner that will maintain the light transmissiveness of the headlamp lens over time.

A feature of the invention is to provide a headlamp washer system that will automatically direct cleaning fluid against the plastic lens of a headlamp periodically to remove dirt from the lens A further feature of the invention is to provide such automatic direct cleaning by a controller that will initiate a cleaning cycle automatically upon each ignition key operation of a motor vehicle.

A still further feature of the invention is to provide for such automatic direct cleaning by a controller that will additionally initiate a cleaning cycle automatically upon a predetermined dirt buildup and will continually repeat a predetermined washing cycle until all dirt buildup has been removed from the lens surface.

A still further object is to provide the aforesaid headlamp cleaning systems with an accurate low cost road lens dirt build-up detection system that is easily integrated into a headlamp housing arrangement.

A still further object is to provide such a lens dirt build-up detection system wherein the sensor includes a photodiode located within a tube integrated into the lamp housing such that the photodiode will detect light scattering internally of the lens.

A still further object is to provide such a lens dirt build-up detection system wherein the sensor is an infrared sensor that is arranged to sense the temperature increase in the headlamp caused by light not passing through the lens.

A still further object is to provide such a lens dirt build-up detection system wherein the sensor is a layer of transparent electrically resistive material either with an integrated circuit or without located on the inner surface of a headlamp lens and, when the temperature changes in the lens due to light not passing through the lens, operates to change the resistance of the material in accordance therewith.

A still further object is to provide such a lens dirt build-up detection system wherein the sensor is an infrared sensor arranged inside or outside the lens of a headlamp to detect the variability of the I/R emissivity of the lens surface caused by the build-up of dirt deposits thereon.

A still further object is to provide such a lens dirt build-up detection system wherein the sensors are arranged to detect the emissions in a plane perpendicular to the light source for detecting the changes light scatter to the edges of an headlamp lens due to road dirt build-up and wherein either the lamp or a separate source is used for emission/baseline.

A still further object is to provide such a lens dirt build-up detection system wherein the sensor is arranged to detect light coming through the lens of a headlamp and wherein the light is provided by a separate light source arranged either above or below the lens.

A still further object is to provide such a lens dirt build-up detection system wherein the sensor is as provided in the preceding object but wherein the light is provided by the headlamp and wherein the lamp lens is modified to increase sensitivity/reliability of detection in the vicinity of the sensor or is modified to provide a filter.

A still further object is to provide such a lens dirt build-up detection system wherein the sensor is arranged as an array of individual sensors integrated into the lens and arranged to detect a spatial non-uniformity in light detection across the array indicative of a dirty lens requiring cleaning action.

A still further object is to provide such a lens dirt build-up detection system wherein the sensor is arranged as an array of individual sensors integrated into the lens and arranged to provide a spectral analysis of light indicative of a dirty lens requiring cleaning action.

Yet another object is to provide a detection system of the preceding object that uses emission lines of an HID lamp by looking at peak strengths (intensities) and/or ratios of peak strengths (intensities) and/or widths.

Still another object is to provide the aforesaid detection system to generate a signal indicating performance degradation of the HID source.

A still further object of the invention is to provide a headlamp washer system with a washer fluid spray nozzle having a sensor integrated therein for detecting the build-up of dirt on the nozzle for providing a signal of possible headlamp lens dirt build-up to initiate a lens cleaning action by the washer system.

These and other objects, advantages and features of the present invention will become more apparent from the following specification when taken with the accompanying drawings wherein:

BRIEF DESCRIPTION OF THE DRAWINGS

FIG. 7 is a diagrammatic view of an integrated tube and photodiode sensor embodiment for detecting light scattering internally of a HID headlamp lens;

FIG. 8 is a diagrammatic view of another embodiment of a lens dirt build-up detection system including an infrared sensor to detect the variability of the I/R emissivity of a HID headlamp lens surface;

FIG. 9 is a diagrammatic view of another embodiment of a dirt film detecting system;

DESCRIPTION OF PREFERRED EMBODIMENTS

Figure 1:
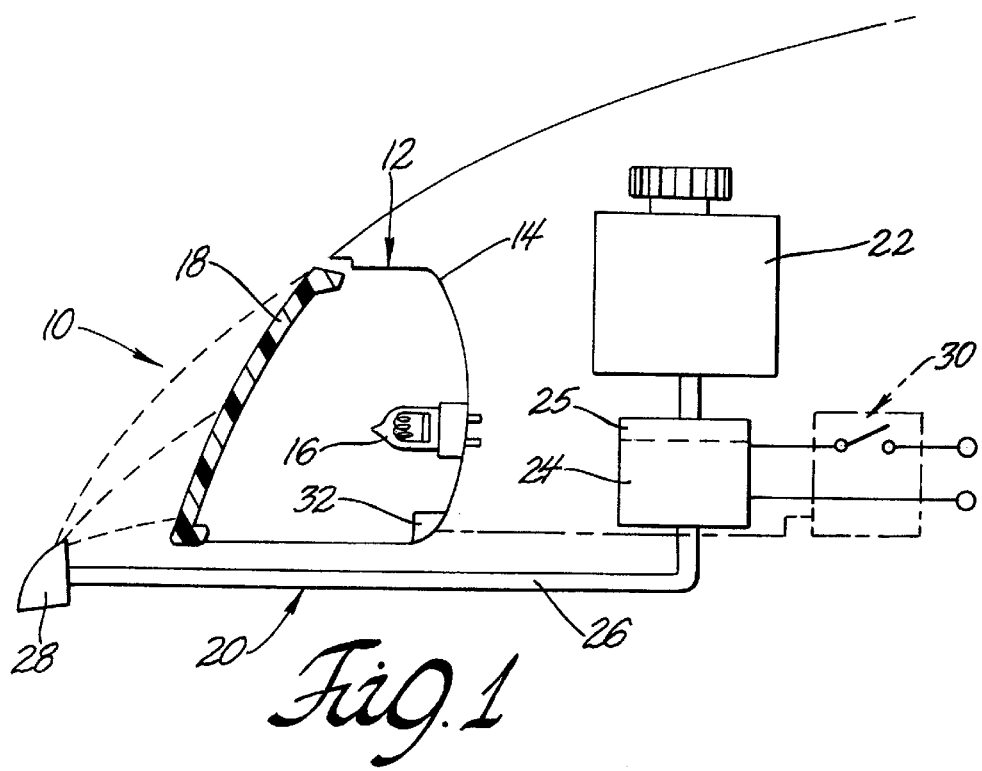
FIG. 1 is a diagrammatic view of a HID headlamp cleaning system including fixed nozzle discharge components.

Referring now to FIG. 1, a headlamp cleaning system 10 has one or more headlamps 12 (one shown in FIG. 1). Each of the headlamps 12 has a housing 14 for a high intensity discharge light source 16 of the type shown in U.S. Pat. Nos. 4,754,373 and 5,036,439. The housing is closed by a covering lens 18 that will disperse light from the light source 16 in a known manner.

In order to maintain the light transmission from the lens, the headlamp cleaning system 10 includes a lens washer system 20. In FIG. 1 the lens washer system includes a source of cleaning fluid 22 that is in communication with a pump 24 that has an electrically controlled driver such as an electric motor 25. The pump 24 is connected by suitable conduits 26 to a nozzle 28 having its outlet arranged so as to direct cleaning fluid against the outer surface of the lens 18 automatically under the control of a controller 30. The nozzle discharge is arranged for distributing the cleaning fluid against the lens for removing dirt build-up.

The lens 18 is formed from plastic having good light transmission and adequate strength against stone impact and the like. Such a plastic headlamp lens 18 can be formed from a plastic material such as polycarbonate copolymers such as Lexan® sold by General Electric Company or polysulfone covered by a suitable abrasion resistant material such as acrylate resins, melamine resins, or siloxane resins. Such plastic lens configurations, however, are heated in HID lamps to a temperature level that can retain road dirt in the outer surface of the lens unless removed therefrom in a timely fashion. Such retention of the dirt has been found to cause dirt to reduce the transparency of the lens material over time. Accordingly, in practicing the present invention, the controller 30 is programmed as will be discussed to cause the lens washer system 20 to be automatically operated so that the pump will discharge fluid through the nozzle 28 each time that the vehicle ignition is turned on. Such cycling of the washer fluid against the lens surface tends to remove road dirt buildup from the previous vehicle driving cycle.

However, in certain cases, the road dirt buildup can exceed the ability of a one time cleaning cycle each time the vehicle ignition is turned on.

Thus, in the embodiment of FIG. 1, the controller 30 is connected to a photometric sensor 32 that is integrated into each of the headlamps 12 and operably connected to the controller 30. The photometric sensor 32 will determine the level of light that is reflected back from excessive road dirt buildup that cannot be removed by a single washer cycle produced on vehicle ignition. As long as road dirt build up is detected by the sensor 32, the controller 30 will produce a signal to the pump driver 25 in a predetermined number of separate washer cycles or in a continuous spray pattern until the road dirt buildup is removed or until the controller 30 detects an excessive number of washer cycles (due to factors such as pump failure or too low cleaning fluid) at which point a signal can be generated to indicate the need for a system check.

Figure 2:
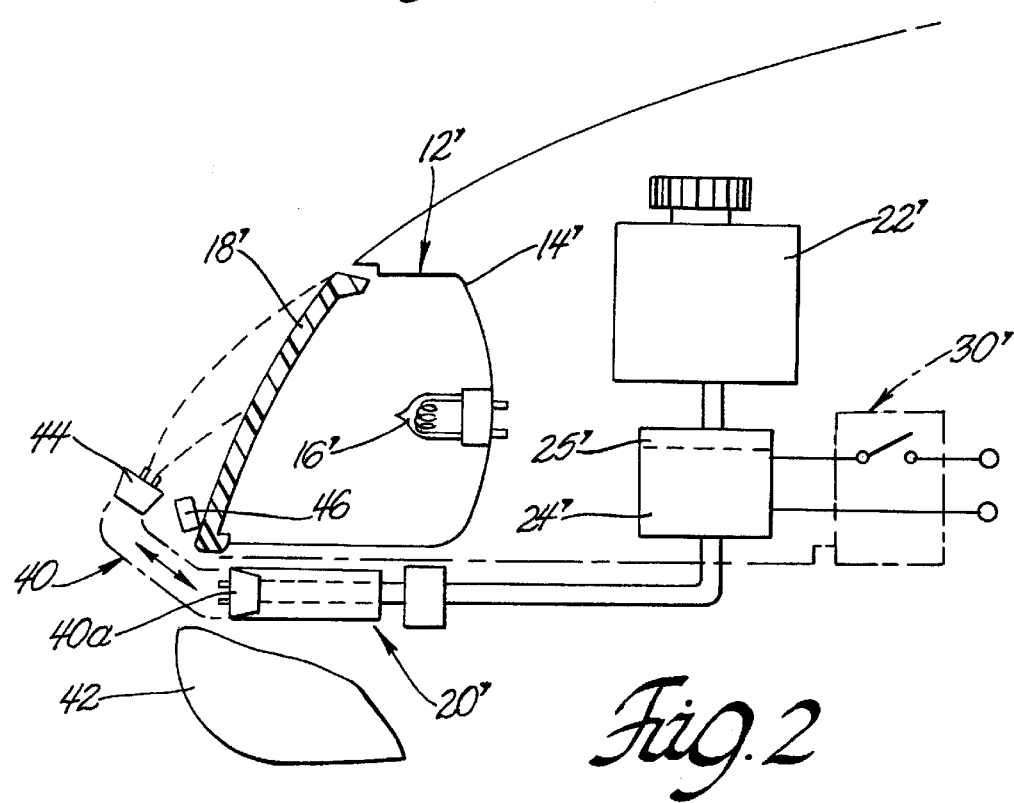
FIG. 2 is a diagrammatic view of a HID headlamp cleaning system including retractable and extendible nozzle discharge components.

In the embodiment of the invention shown in FIG. 2 common components are identified with the same reference numeral as in the FIG. 1 embodiment. The difference in this embodiment is that the lens washer system 20' has a retractable nozzle assembly 40 that can be positioned between a retracted position within the vehicle body as shown diagrammatically at 40a within a vehicle bumper fascia 42 and an extended position wherein the outlet of a nozzle 44 on the nozzle assembly 40 is located approximately 20 mm in front of the outer face of the lens 18' so that a low pressure pump having a discharge pressure of 40–60 psi that will be effective at such a proximate location for removing road dirt from the lens without the need for an expensive high pressure fluid source.

While the embodiment of FIG. 2 can be operated by the control components shown in the FIG. 1 embodiment, in the FIG. 2 embodiment, an infra-red sensor 46 is located exteriorly of the lens so that as the road dirt buildup increases less light energy will be directed from the light source 16' such that at a predetermined reduction the sensor 46 will produce a signal that will be converted by the controller 30' to initiate a washer operation to remove the excessive road dirt buildup that cannot be removed by a single washer cycle produced on vehicle ignition. As long as road dirt build up is detected by the sensor 46, the controller 30' will produce a signal to the pump driver 25' in a predetermined number of separate washer cycles or in a continuous spray pattern until the road dirt buildup is removed.

Figure 3:
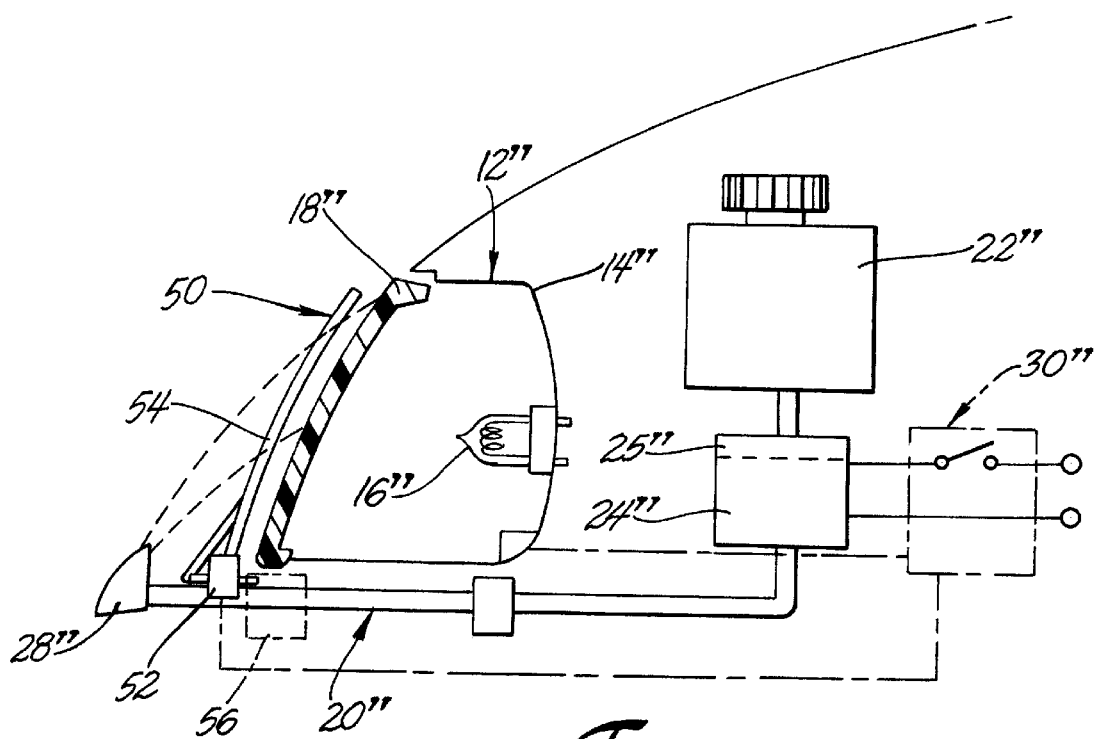
FIG. 3 is a diagrammatic view of a HID headlamp cleaning system including a wiper blade component.

A further feature of the present invention is shown in FIG. 3 including the same parts as in the prior FIG. 1 embodiment with the same reference numeral double primed. A wiper system 50 is provided that is operative to cause a wiper to be drawn over the headlamp lens 18" surface each time that the washer system 20" is turned on by controls corresponding to those previously described. The wiper system 50 includes a carrier 52 for a wiper blade 54. The carrier 52 is connected to a drive unit 56 operably connected to the controller 30". In the FIG. 3 embodiment, cleaning fluid is provided by a washer system 20" with components like those in the embodiment of FIG. 1.

Figure 4:
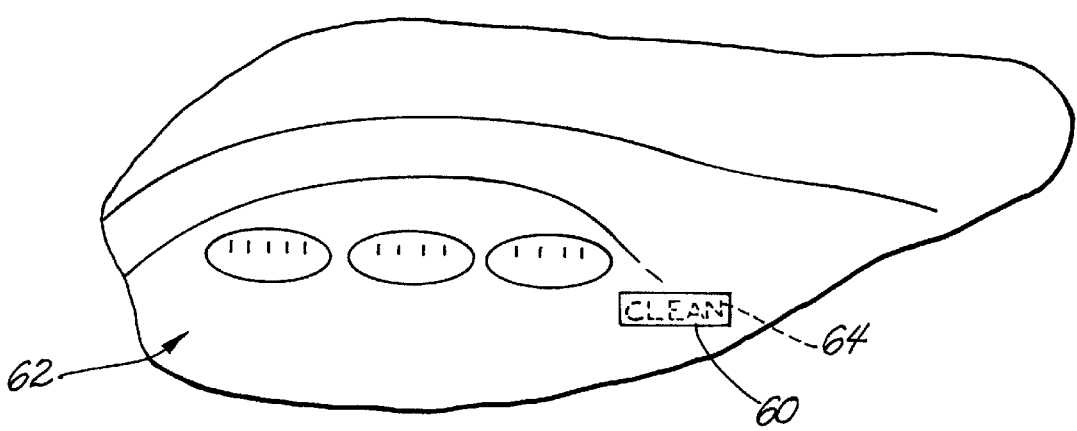
FIG. 4 is a diagrammatic view of a monitoring system for use in the cleaning systems of FIGS. 1–3.
Figure 5:
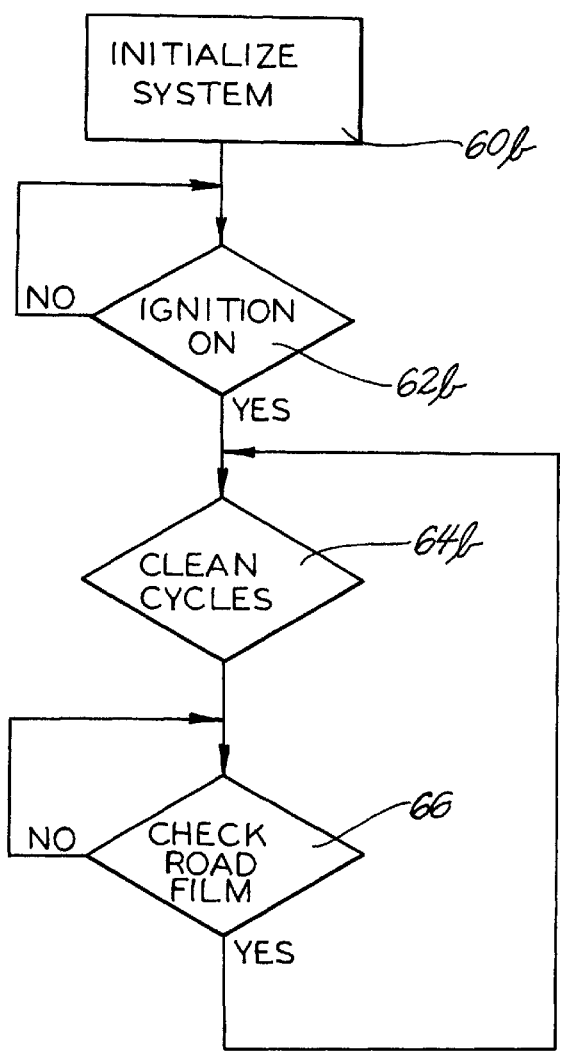
FIG. 5 is a flow chart of a control sequence for operating headlamp cleaning systems according to the method of the present invention.

In FIG. 4 a road dirt monitor system 60 is shown on an instrument panel 62. It indicates the status of the road dirt buildup by directing a signal from the controller 30 to a light emitting diode or other display 64 that will indicate the percentage of road dirt removal following each automatic cycle of the washer system 20.

The embodiments in FIGS. 1–5, 6, 7, 8, 9, 10, 11, 12, 13 and 14 all embody an accurate low cost road lens dirt build-up detection system that is easily integrated into a HID headlamp housing arrangement or in other headlamp assemblies including a light source and a covering lens.

Figure 6:
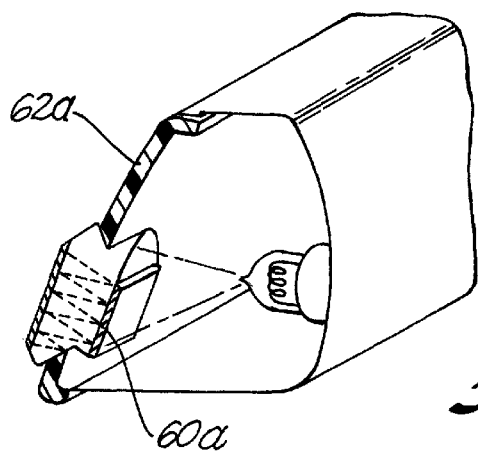
FIG. 6 is a diagrammatic view of another embodiment of a sensor for detecting light scattering internally of a HID headlamp lens.

In the embodiment of FIG. 6, a sensor 60a is arranged to detect light scattering internally of an HID headlamp lens 62a. Grime or dirt on the front surface of lens 62a reduces output light that is scattered/reflected back towards sensor, increasing its output signal.

More specifically, in the embodiment of FIG. 7, a lens dirt build-up detection system 70 is shown in association with an HID headlamp 72 with a lens 73, a light source 75 and a housing 77. The detection system 70 includes a controller 74 like those described in the embodiment of FIGS. 1–5. In this embodiment a sensor is provided as a photodiode 76 located within a tube 78 that is integrated into the lamp housing 77 such that the photodiode 76 will detect light scattering internally of the lens 73.

In the embodiment of FIG. 8, a lens dirt build-up detection system 80 is shown associated with a HID headlamp 82 like that in the preceding embodiment. In this embodiment the headlamp lens 84 and housing 86 are heated to different temperatures depending upon the amount of road dirt on the lens. The temperature of the headlamp 82 is detected by an infra-red sensor 88 that signal a microcomputer 85 to produce a washer activation signal when the temperature increase in the HID lamp caused by light not passing through the lens is detected. In such systems, the headlamp 82 needs to reach a steady state temperature in order to obtain reliable operation. The increased temperature due to a dirty lens is compared to a reference value in a suitable lookup table in the microcomputer 85.

In the embodiment of FIG. 9, a lens dirt build-up detection system 90 is associated with an HID headlamp 92 including a lens 93, a housing 95 and a light source 97. In this embodiment a sensor is provided as a layer of light transparent, electrically resistive material 94 either with an integrated circuit 96 or without located on the inner surface 98 of the lens 93. The resistance of the material 94 varies in accordance with the temperature changes in the lens due to light not passing through the lens to provide an input signal to a control circuit 99 for initiating a headlamp washer sequence when the lens 93 is dirty.

Figure 10:
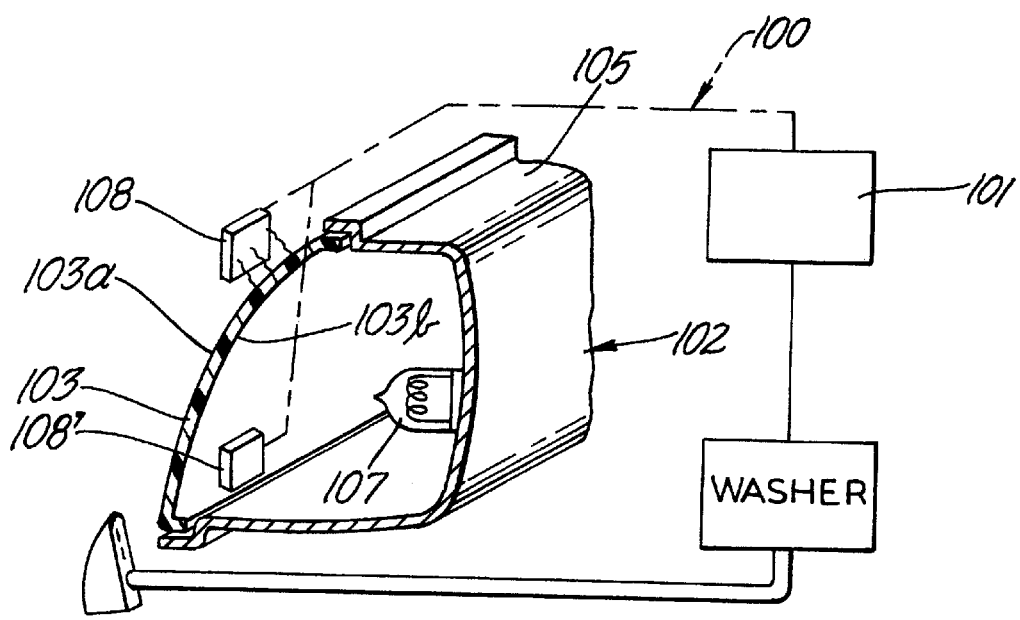
FIG. 10 is a diagrammatic view of still another embodiment of the invention.

In the embodiment of FIG. 10, a lens dirt build-up detection system 100 with a controller 101 is associated with an HID headlamp 102 including a lens 103, a housing 105 and a light source 107. In this embodiment wherein the sensor is an infrared sensor 108, 108' arranged inside or outside the lens of a HID lamp to detect the variability of the I/R emissivity of the lens surface 103a or 103b depending upon the location of the sensors 108, 108' as caused by the build-up of dirt deposits thereon. The sensor signal is processed by controller 101 to produce a washer activation output.

Figure 11:
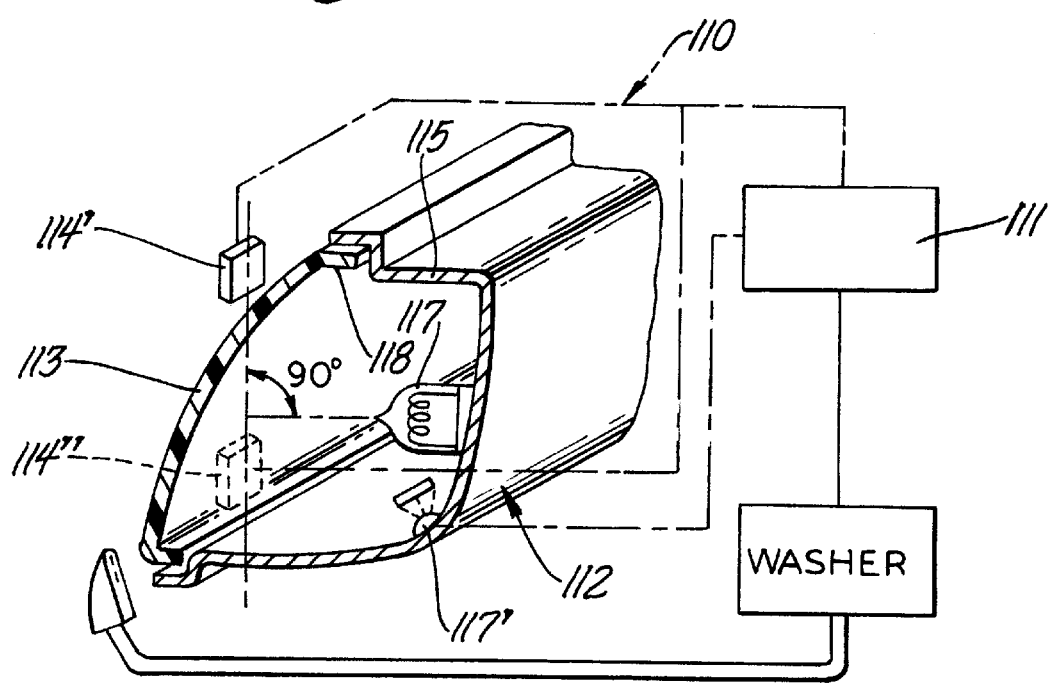
FIG. 11 is a diagrammatic view of still another embodiment for sensing lens dirt build-up wherein the sensors are arranged to detect the emissions in a plane perpendicular to the light source.

FIG. 11 shows a lens dirt build-up detection system 110 with a controller 111 that is associated with an HID headlamp 112 including a lens 113, a housing 115 and a light source 117. In this embodiment sensors 114–114' such as, laser diodes, IR photodiodes, spectral type, UV fluorescence type, are arranged to detect the emissions in a plane P perpendicular to the light source for detecting the light scatter across the lens between at the peripheral edge 118 of the lens 113 as the road dirt builds and wherein either the light source 117 or a separate light source 117' is used for emission/baseline as sensed by sensors 114—114. The signals from sensors 114—114 are compared and processed by controller 111 to produce a washer activation output.

Figure 12:
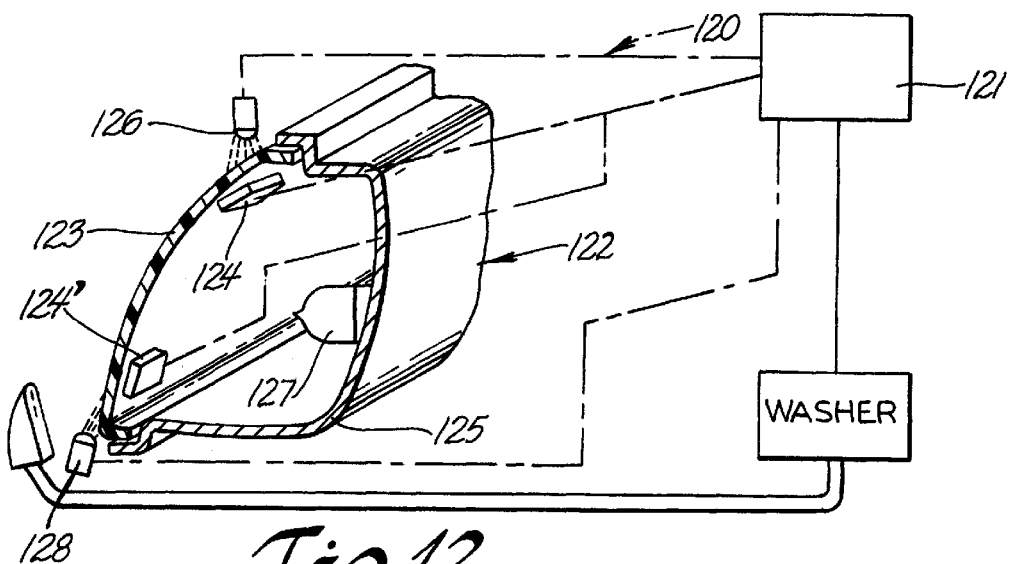
FIG. 12 is a diagrammatic view of yet another embodiment of a lens dirt build-up detection system including a sensor and a separate light source and wherein the sensor is arranged to detect light coming through the lens of an HID lamp from the separate light source.

FIG. 12 shows a lens dirt build-up detection system 120 with a controller 121 that is associated with an HID headlamp 122 including a lens 123, a housing 125 and a light source 127. In this embodiment a sensor 124, 124' (either a photodiode, IR sensor or other light sensitive device) is arranged to detect light coming through the lens 123 wherein the light is provided by a separate light source 126 or 128, respectively arranged either above or below the lens 123. When sensors 124, 124' detect less light, the signal therefrom is processed by controller 121 to produce washer activation output.

Figure 13:
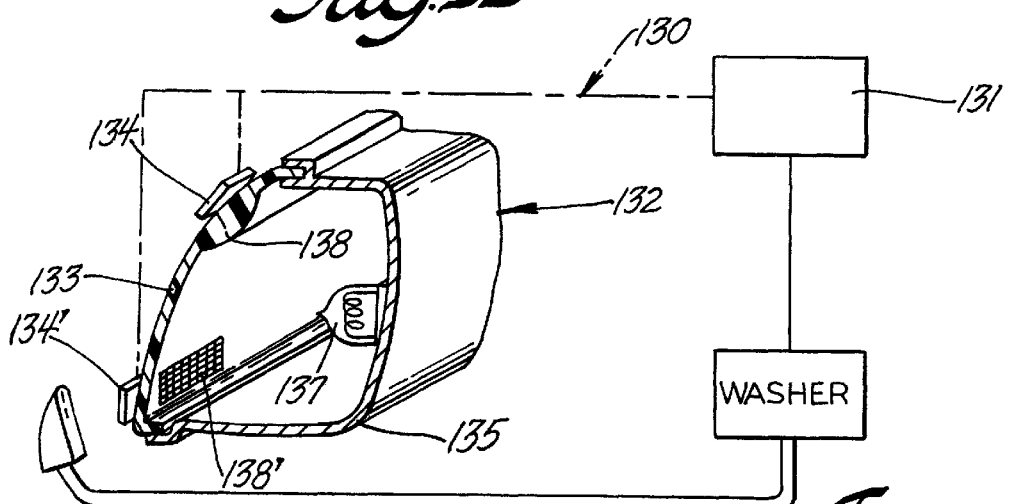
FIG. 13 is diagrammatic view of still another embodiment of the invention including a lens dirt build-up detection system wherein the sensor is as provided in the preceding object but wherein the light is provided by a light source and wherein the lamp lens is modified in the vicinity of the sensor or is modified to provide a filter.

In FIG. 13 a lens dirt build-up detection system 130 with a controller 131 is associated with an HID headlamp 132 including a lens 133, a housing 135 and a light source 137. In this embodiment, a sensor 134, 134' is provided as shown in the preceding object but in this embodiment the light source is provided by the HID lamp source 137. The lamp lens is shaped at 138 to focus the light from the lamp source 137 for better reference than a general lens light scatter or is configured at 138' to provide a filter of the light from the source 137 for such improved reference. When sensors 134, 134' detect less light, the signal therefrom is processed by controller 131 to produce a washer activation output.

Figure 14:
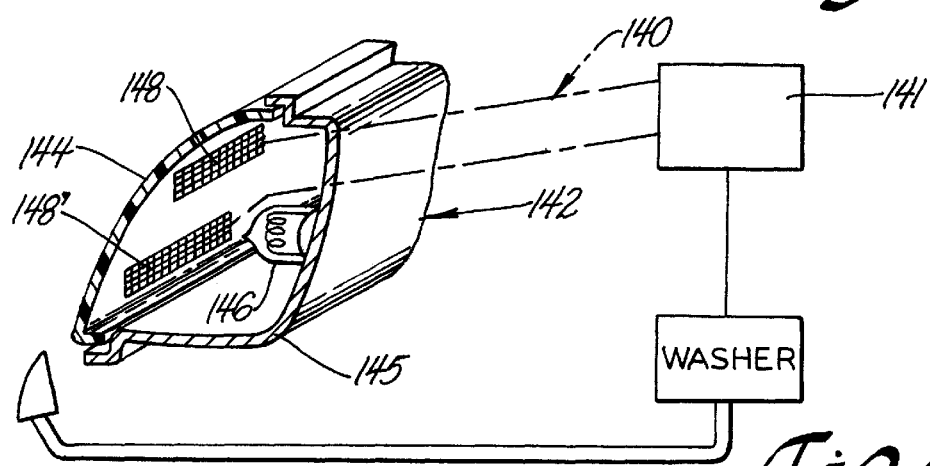
FIG. 14 is a diagrammatic view of another embodiment of the invention provide as a lens dirt build-up detection system wherein the sensor is arranged as an array of individual sensors integrated into the lens and arranged to detect a spatial non-uniformity in light detection across the array indicative of a dirty lens requiring cleaning action.

In FIG. 14 a lens dirt build-up detection system 140 with a controller 141 is associated with an HID headlamp 142 including a lens 144, a housing 145 and a light source 146. In this embodiment, sensors are an array 148, 148' of individual sensors integrated into the lens and arranged to detect a spatial non-uniformity in light detection across the array indicative of a dirty lens requiring cleaning action. Such spatial arrays reduce false readings and can be configured to increase sensor sensitivity. When sensors 148, 148' detect less light, the signal therefrom is processed by controller 141 to produce a washer activation output. If array 148, 148' is inside, a separate source may/may not be required. Alternatively, one array 148 can be inside and one array 148' can be outside to produce a differential signal between clean and dirty to monitor output of the headlamp (and thus the level of dirt buildup).

Figure 15:
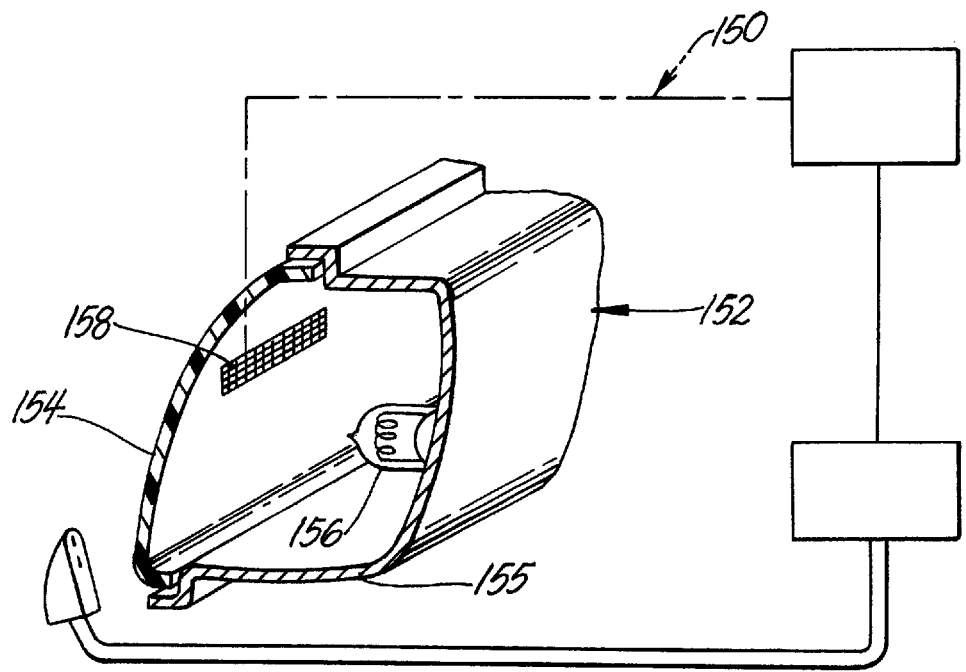
FIG. 15 is a diagrammatic view of a still further embodiment to provide a lens dirt build-up detection system wherein the sensor is arranged as an array of individual sensors integrated into the lens and arranged to provide a spectral analysis of light that if a narrow band monitoring only a couple of absorption lines indicative of a dirty lens requiring cleaning action.

FIG. 15 shows a lens dirt build-up detection system 150 that includes the controller and washer of FIG. 14. The system 150 is associated with an HID headlamp 152 including a lens 154, a housing 155 and a light source 156. In this embodiment a sensor is arranged as an array 158 of individual sensors integrated into the lens and arranged to provide a spectral analysis of light that if a narrow band monitoring only two absorption lines indicative of a dirty lens requiring cleaning action. The sensor array 158 is tuned to monitor only either a narrow absorption and/or emission lines of the headlamp light source 156. The array 158 can be a layer thin film or filtered multiple sensitivity sensors.

Figure 16:
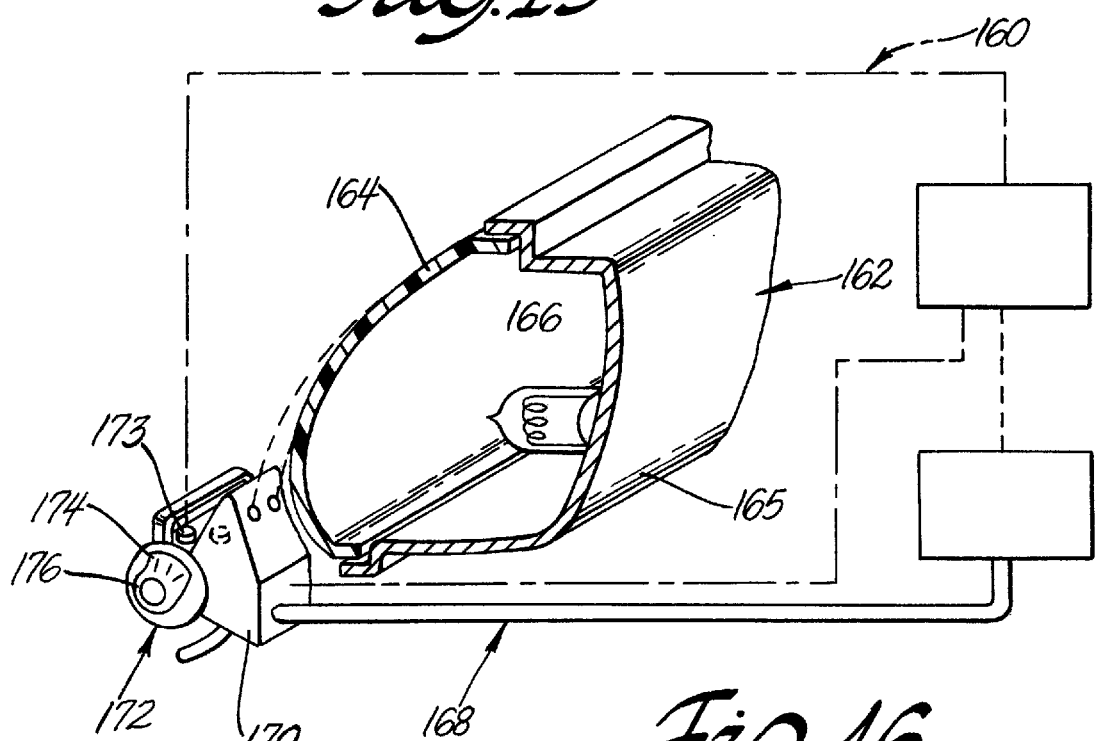
FIG. 16 is a diagrammatic view of a still further embodiment of the invention configured to provide a headlamp washer system with a washer fluid spray nozzle having a sensor integrated therein for detecting build-up of dirt thereon as an indicator of a headlamp lens dirt build-up requiring initiation of a lens cleaning action by the washer system.

FIG. 16 shows a lens dirt build-up detection system 160 that is associated with an HID headlamp 162 including a lens 164, a housing 165 and a light source 166. A still further object of the invention is to provide a headlamp washer system 168 with a washer fluid spray nozzle 170 having a sensor package 172 including a photodiode 173 or other suitable light sensitive device located on one side of a sensor lens 174. A light source 176 is included in the sensor package 172 to illuminate the lens 174. The sensor package is integrated with the nozzle 170 so that the washer system 168 and detection system 160 can be assembled on a vehicle as a single module that is arranged for detecting the build-up of dirt on the nozzle for providing a signal to a control system 178 to initiate a headlamp washer spray sequence for removing the dirt buildup from the outer surface of the lens 164. In the illustrated embodiment the amount of dirt buildup on the sensor 172 will approximate the dirt buildup on the lens due to the disposition of the sensor in a location such that its covering surface will of possible headlamp lens dirt build-up to initiate a lens cleaning action by the washer system. It will be cleaned by a secondary discharge from the spray nozzle 170 at the same time the lens 164 is cleaned.

The controller 30, 30' 30" (etc.) is a microcomputer. A suitable flow chart of the control is set-forth in FIG. 5 as follows: initializing the controller (60*b*); once initialized the control sequence includes detecting vehicle ignition (62*b*). If the vehicle ignition is on, the method includes cleaning cycles (64*b*); road dirt is checked following each of the cleaning cycles (66); if the lens is clean, periodically repeat detection cycles.

Thus, according to the invention an improved process for cleaning a headlamp lens is accomplished by the steps of:

providing a headlamp 10 including a high intensity discharge source of light 12;

providing a headlamp lens 18 formed from a plastic material such as polycarbonate copolymers such as Lexan® sold by General Electric Company or polysulfone covered by a suitable abrasion resistant material such as acrylate resins, melamine resins, or siloxane resins.

providing a lens washing system 20 including a source of pressurized fluid and a nozzle for distributing cleaning fluid against the lens;

operating the lens washing system each time that a vehicle ignition is turned on.

Alternatively and/or additionally providing such a process including the steps of providing a sensor 32, 46 and instituting one or a multiple washing cycle and a check of road dirt buildup on the lens and continuing the multiple washing cycle until dirt build-up is removed from the lens.

Alternatively and/or additionally providing such a process further comprising monitoring the level of dirt build-up on the lens and continuing the operation of the lens washing system until the monitoring indicates that the dirt has been removed from the lens.

While various methods of control can be utilized in practicing the process of the present invention it includes arrangements wherein the monitoring includes direct sensing of the level of light passing through the headlamp lens. The direct sensing can include either infrared detection or photometric detection. The process of monitoring includes a display observable from within a motor vehicle.

Further, while various of the embodiments are applicable especially for high temperature HID type headlamps, it should be understood that the application of the sensor/cleaning systems herein have use in other headlamp applications, including those with tungsten halogen bulbs and sealed beam resistance filament headlamps.

The disclosed embodiments are representative of presently preferred embodiments and processes but are intended to be illustrative rather than definitive thereof. The invention is defined in the claims:

What is claimed is:

1. A headlamp cleaning system having a headlamp with a housing; a source of light and a covering lens and a lens washer system including a source of fluid, a pump for the fluid and a nozzle for distributing the fluid against the lens for removing dirt build-up characterized by: said headlamp including the source of light; said lens formed from a polymer and a control system for energizing said pump during a cleaning cycle for distributing washer fluid against said lens each time that a vehicle ignition is turned on; a headlamp housing for said lens; said control system including a lens dirt build-up detection system integrated into said headlamp housing.

2. The headlamp cleaning system of claim 1 further characterized by a sensor and a tube; said sensor including a photodiode located within said tube; said tube integrated into said lamp housing such that photodiode will detect light scattering internally of said lens.

3. A headlamp cleaning system having a headlamp with a housing; a source of light and a covering lens and a lens washer system including a source of fluid, a pump for the fluid and a nozzle for distributing the fluid against the lens for removing dirt build-up characterized by:

said headlamp including a source of light; and a control system for energizing said pump during a cleaning cycle for distributing washer fluid against said lens each time that the vehicle ignition is turned on; a headlamp housing for said lens; said control system including a lens dirt build-up detection system integrated into said headlamp housing.

4. The headlamp cleaning system of claim 3 further characterized by a sensor and a tube; said sensor including a photodiode located within said tube; said tube integrated into said headlamp housing such that said photodiode will detect light scattering internally of said lens.

* * * * *

UNITED STATES PATENT AND TRADEMARK OFFICE
CERTIFICATE OF CORRECTION

PATENT NO. : 6,189,808 B1 Page 1 of 1
DATED : February 20, 2001
INVENTOR(S) : Daniels et al.

It is certified that error appears in the above-identified patent and that said Letters Patent is hereby corrected as shown below:

Column 6,
Line 26, After "sensors" delete [114-114'] and insert therein -- 114-114 --

Signed and Sealed this

Twelfth Day of March, 2002

Attest:

Attesting Officer

JAMES E. ROGAN
*Director of the United States Patent and Trademark Office*